June 4, 1935.    J. E. TRAINER ET AL    2,003,320
WELDING DEVICE
Filed Dec. 9, 1931    2 Sheets-Sheet 1
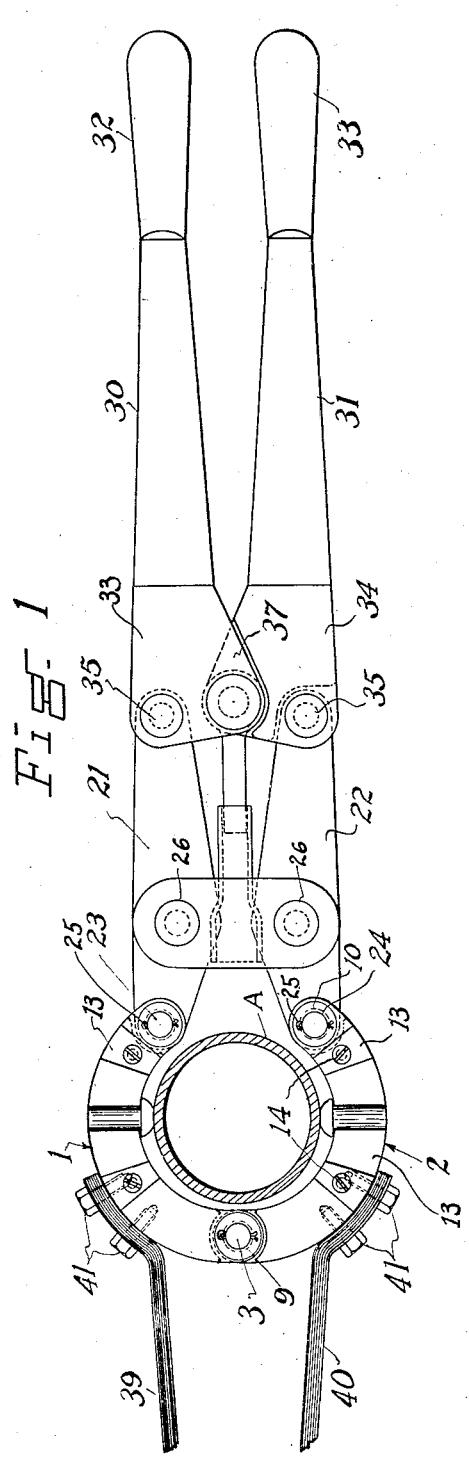
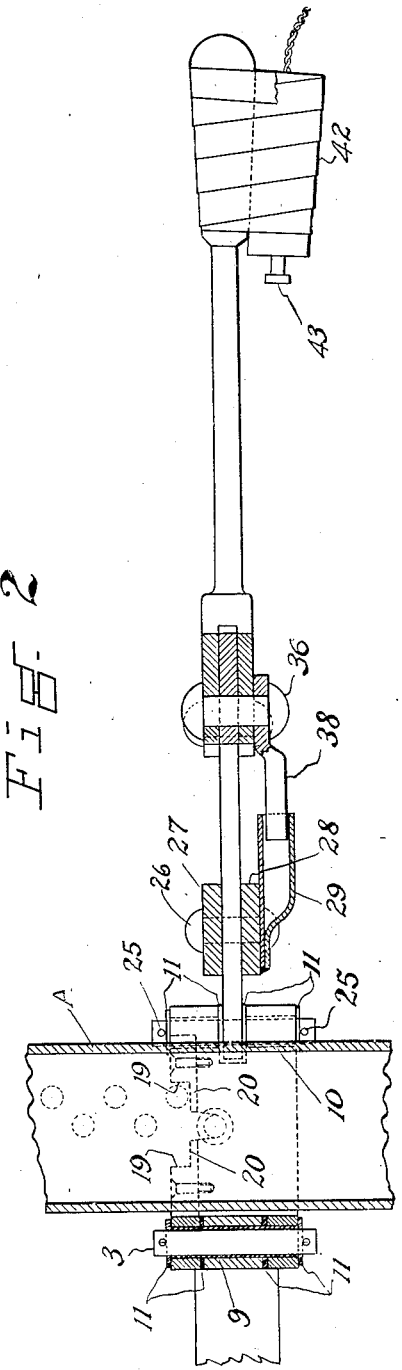
INVENTOR
James E. Trainer
Crawford Ziegler
BY
ATTORNEY

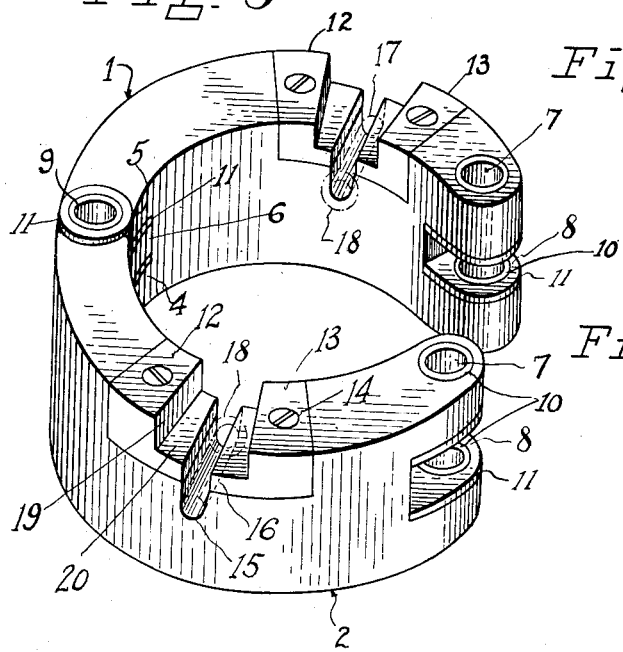
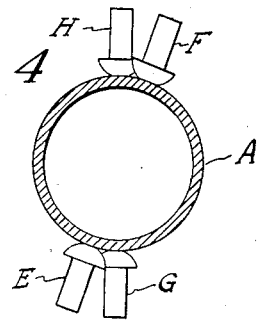
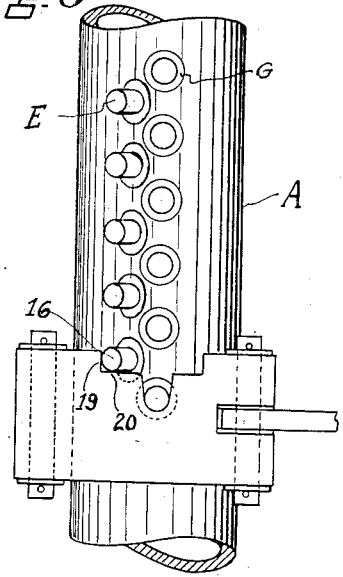
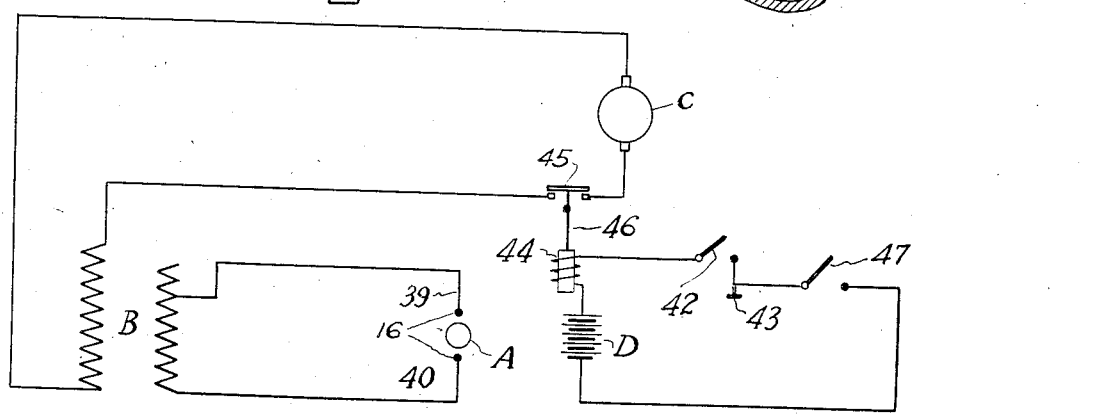

Patented June 4, 1935

2,003,320

UNITED STATES PATENT OFFICE 2,003,320

WELDING DEVICE

James E. Trainer, Fairlawn, and Crawford Ziegler, Barberton, Ohio, assignors to The Babcock & Wilcox Company, Bayonne, N. J., a corporation of New Jersey Application December 9, 1931, Serial No. 579,848

8 Claims. (Cl. 219—4)

This invention relates to a welding device.

Usually devices of the aforesaid character, particularly of the resistance type, are cumbersome and consequently of a stationary character, with the result that such devices are not adaptable to portable work, whereas the present invention is a welding device of the resistance type particularly suitable for service work in the field.

In addition, the invention provides a welding device in which jointed electrodes, insulated from each other, and carrying at least one of the parts to be welded, cooperate with the part or parts to be operated upon in such manner that the jointed electrodes may be simply articulated to bring the parts in welding pressure relation.

In particular, the invention relates to the pivotal association of two electrodes, suitably insulated, and each carrying a part to be welded in place, and which are associated in embracing relation with respect to the part to which the electrode carried parts are to be welded, and the electrodes are connected with a lever system whereby the said electrodes may be moved on their pivot to engage the respective parts in welding pressure relation.

A further feature of the invention resides in combining the pivotally, or otherwise jointed electrodes and their articulating means, with a system of controls whereby the welding circuit may be completed manually, and interrupted after a predetermined limit of either movement or time dimension.

With the above and other objects in view, and for the particular purpose of making such disclosure as is legally required by the Patent Statutes, there is described in the following, and illustrated in the accompanying drawings, one specific form in which the invention may be practiced.

In the drawings,

Figure 1 is a top plan view of the welding device;

Fig. 2 is a sectional side elevation in the plane of the line 2—2 of Fig. 1;

Fig. 3 is a perspective view of the electrodes;

Fig. 4 is a transverse section of a tube to which rows of pins have been applied;

Fig. 5 is a side elevation of the same; and

Fig. 6 is a schematic diagram of one type of welding circuit and attendant control system.

In detail—

The invention, as illustrated in the drawings, is shown as a device for welding pins to tubes, the tubes being indicated at A and which is embraced by two substantially semi-circular electrodes 1 and 2 drilled to receive the pin 3 whereby the said electrodes are pivotally associated.

Both of the electrodes 1 and 2 are substantially identical with the exception of being right and left handed, as a consequence of which one is provided with the pintle tangs 4 and 5 between which is received the pintle tang 6 of the complementary electrode. Also, each electrode is drilled at its other end as shown at 7, and slotted at 8 to receive the articulating means to be hereinafter described. In order to insulate the electrodes from each other, and from the articulating means, the holes receiving the pin 3 and the holes 7 are fitted with insulating bushings 9 and 10 respectively; cooperating insulating washers 11 are placed on all flat surfaces where there would otherwise be danger of short circuit.

With respect to the means for holding the pins to be welded to the tubes A, the electrodes 1 and 2 are similarly constructed, except for being right and left handed as before stated, so that the description of one will suffice for both.

Each electrode 1 and 2 is cut away on the upper surface to receive insulating members 12 and 13 held in place by screws 14, the insulating members 12 and 13 being located on each side of a pin receiving groove 15, one of the pins 16 being shown in position and comprising a shank 17 lying along the groove and a head 18 abutting the inside face of the electrode.

The insulating members 12 and 13 are cut away to provide abutment faces 19 and 20 at right angles to each other to act as stops against pins that have been welded on the tube as will be hereinafter described in connection with the method of applying the successive rows of pins.

For articulating the jointed electrodes 1 and 2, links 21 and 22 each have one end received in the slots 8 of the electrodes and are secured by pintle pins 23 and 24 removably located by cotter pins 25 or otherwise, the pin 3 pivotally associating the electrodes being similarly secured.

Intermediate the ends of links 21 and 22, and secured by rivets or screws 26, are links 27 and 28, the lower of which has fixed thereto the handle aligning socket 29; handles 30 and 31 have grips 32 and 33 at their outer ends, and are bifurcated at their opposite ends as shown at 33' and 34 and receive the ends of the links 21 and 22 to which they are pivotally attached by rivets or screws 35, while a center pin or rivet 36 extends through the interfitting projections 37 and carries a handle aligning plunger 38 moving in the socket 29. The foregoing parts with handles 30 and 31 constitute the articulating means by which the electrodes 1 and 2 are worked to open and close on their pivot pin or pintle 3. The circuit leads 39 and 40 are indicated as secured to the electrodes by cap screws 41 and such leads are similarly numbered in the diagrammatic circuit shown in Fig. 6, and these leads are flexible to permit the portable device to be moved easily along tube A.

Beneath one of the handles 32 or 33 is a switch 42, similarly numbered in Fig. 6 and which may be operated by the plunger 43 to open and close the circuit of a solenoid-operated switch 44 energizing the welding circuit.

The welding circuit is illustrated diagrammatically in Fig. 6 and is constituted of the usual transformer or transformers B, the primary of which is in circuit with a source of energy C and which circuit is opened and closed by movement of the contact 45 on the plunger 46 of the solenoid-operated switch 44, and the opening and closing of which de-energizes or energizes the circuit of the secondary of the transformers B. The control system includes the solenoid of the switch 44 and which receives current from source D when plunger 43 of the switch 42 is closed; an additional switch 47 may be incorporated, as shown, for the purpose of forming a cut-out based upon a travel dimension of the levers 30 and 31, or upon a dimension of time since the ability to bring the metal to a welding temperature is a function of both energy and time.

The method of welding the pins 16 to the tube A is to first remove either the pintle pin 3, or one of the pintles 23 or 24, and encircle the tube A with the electrodes 1 and 2, after which the assembly is completed by replacing the removed pintle. It is important that the transformer leads 39 and 40 of the circuit be sufficiently flexible to permit the device to be moved longitudinally of the tube A.

Pins 16 are then placed in the grooves 15 of the electrodes 1 and 2 with the heads 18 in the position shown, and with the device in a position on the tube such that the pins to be initially welded in position will be at the remote end of the row of pins when the row is completed; this procedure enables the pins as they are applied to be used as the gauging means by which successive pins are applied.

With the device in the position described, and pins 16 in place, the handle grips 32 and 33 are pressed toward each other to move the electrodes 1 and 2 together and contact the pin heads 16 with the tube at the same time pressing the plunger 43 to close the welding circuit; local heating to the fusion point takes place at the point of contact of the pin heads 18 with the tubes and by the pressure applied welds them integrally with the metal of the tube, in fact such is the integrity of the weld that when a pin is broken away a piece of the tube metal comes with it.

The foregoing operation leaves two diametrically opposite pins E and F welded in position and which act as a limit gauge for positioning the next two pins. The current having been shut off by releasing the plunger 43 the device is opened by moving handle grips 32 and 33 apart and the device then lowered and two new pins placed in grooves 15, after which the device is moved into a position where the previously applied pins E and F rest on the insulating surfaces 20, one on one side of its adjacent groove 15 and the other on the opposite side of its respective groove 15, and again the handles 32 and 33 are pressed toward each other and the circuit closed by the plunger 43 and two more pins G and H are welded to the tube A in diametrically opposite relation but staggered with respect to pins E and F. Repetition of this procedure produces rows of alternately staggered pins welded to the tube A.

It will be observed from the foregoing that any one of several commercial types of switches may be adapted to the handles 30 and 31, or to other relatively moving parts of the device for cutting off the current either on the basis of travel of the handles or on the basis of time required for the weld.

While we have described a device which applies only two pins at a time, a greater number of pins may be applied by simply increasing the number of slots 15, and also by the same token pins may be applied in successive rows of pins equally spaced circumferentially as well as lengthwise of a tube without departing from the spirit of the invention.

In the foregoing we have described a particular form of practicing the invention, but it is nevertheless to be understood that the invention may take any other form falling within the scope of the appended claims defining the same.

We claim—

1. The combination with a resistance welding circuit for parts to be welded together, of pivotally associated electrodes insulated from each other and adapted to carry at least one of said parts, means for engaging previously welded parts for predetermining the position of succeeding parts to be welded, and means for articulating the said electrodes to bring the parts in welding pressure relation.

2. The combination with a resistance welding circuit for parts to be welded together, of pivotally associated electrodes insulated from each other and adapted to carry at least one of said parts, means insulated from said electrodes and for engaging previously welded parts for predetermining the position of succeeding parts to be welded, and means for articulating the said electrodes to bring the parts in welding pressure relation.

3. In combination with a welding circuit, a work guided welding tool comprising movable electrode means carrying a part to be welded to the tool guiding portion of the work, means for performing welding engagement between the work parts, and means for closing the welding circuit.

4. In combination with a welding circuit, a work guided welding tool comprising movable electrode means carrying a part to be welded to the tool guiding portion of the work, means for performing welding engagement between the work parts, and means for closing and opening the welding circuit in accordance with predetermined limitations.

5. In combination with a welding circuit, a welding tool comprising pivotally associated electrode means carrying a part to be welded to the work, means for articulating the electrode means to bring the said part and work into welding pressure engagement, and means for closing the welding circuit.

6. In combination with a welding circuit, a welding tool comprising pivotally associated electrode means carrying parts to be welded to the work and movable therealong, means for articulating the electrode means to bring the work parts into welding pressure engagement, means on the tool for engagement with previously welded parts for predetermining the position of other parts to be applied, and means for closing the welding circuit.

7. In combination with a welding circuit, a welding apparatus including an electrode means adapted to carry a part to be welded to the work, means for newly positioning the apparatus with respect to the work, after each welding operation, from a part previously welded to the work, thereby gauging the position of the part to be welded during the welding operation and facilitating the successive addition of parts in desired relationship, and means for controlling the current in the welding circuit.

8. In combination with a welding circuit, a welding apparatus including movable electrode means adapted to carry a part to be welded to the work, means adapted to contact with a previously applied part for successively positioning the apparatus with respect to the work, and means for controlling the current in the welding circuit.

JAMES E. TRAINER.
CRAWFORD ZIEGLER.